US012268189B2

(12) United States Patent
Luo

(10) Patent No.: US 12,268,189 B2
(45) Date of Patent: Apr. 8, 2025

(54) ELECTRIC FENCE DEVICE AND SYSTEM

(71) Applicant: Shenzhen Wellturn Technology Co., Ltd., Guangdong (CN)

(72) Inventor: Xingsheng Luo, Guangdong (CN)

(73) Assignee: Shenzhen Wellturn Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/764,275

(22) Filed: Jul. 4, 2024

(65) Prior Publication Data

US 2025/0072394 A1 Mar. 6, 2025

Related U.S. Application Data

(63) Continuation-in-part of application No. 18/493,011, filed on Oct. 24, 2023.

(30) Foreign Application Priority Data

Aug. 31, 2023 (CN) .......................... 202311130640.X

(51) Int. Cl.
*A01K 15/02* (2006.01)
(52) U.S. Cl.
CPC ................................ *A01K 15/023* (2013.01)

(58) Field of Classification Search
CPC .................................................... A01K 15/023
See application file for complete search history.

(56) References Cited

U.S. PATENT DOCUMENTS

| | | | |
|---|---|---|---|
| 7,259,718 B2 * | 8/2007 | Patterson | A01K 15/023 342/463 |
| 10,159,219 B2 * | 12/2018 | Van Curen | A01K 15/022 |
| 2014/0318475 A1 * | 10/2014 | Gurley | A01K 27/009 340/573.3 |
| 2018/0184618 A1 * | 7/2018 | Gotts | A01K 27/009 |

* cited by examiner

*Primary Examiner* — Daryl C Pope

(57) ABSTRACT

An electronic fence device includes: a transmitter, arranged to preset a fence range or a restricted range; and at least one receiver, configured to be worn on a pet. The transmitter comprises a locating module; each of the at least one receiver comprises a tag module; the locating module and the tag module are configured to exchange measurement signals therebetween to monitor a location of the pet in real time. The transmitter is configured to compare the location of the pet with the fence range or the restricted range; in response to the pet being located out of the fence range or entering the restricted range, the transmitter is configured to provide a feedback to the receiver to give a warning to the pet.

19 Claims, 5 Drawing Sheets

ELECTRIC FENCE DEVICE AND SYSTEM

CROSS REFERENCE TO RELATED APPLICATIONS

The present application is a continuation-in-part application of the U.S. patent application Ser. No. 18/493,011, filed on Oct. 24, 2023, and claims the priority of the Chinese patent application No. CN202311130640.X, filed on Aug. 31, 2023. Contents of which are incorporated herein by its entireties.

TECHNICAL FIELD

The present disclosure relates to the field of electric fences, and in particular to an electric fence device and an electric fence system.

BACKGROUND

A pet electric fence is configured to artificially set a virtual fence range to prevent a pet from escaping and protect safety of the pet. Usually, the usual electric fence consists of two parts. A first part is a transmitter, taking radio waves to form the virtual fence range. A second part is a receiver worn by the pet. The transmitter and the receiver operate cooperatively to monitor a location of the pet in real time. When the pet runs out of a boundary of the electric fence range, the receiver transmits a warning signal. After training the pet for a certain period of time, the pet can understand where the boundary is and a penalty for exceeding the boundary, such that a probability of the pet escaping out of the electric fence range may be reduced.

In the art, the electric fence device only form the virtual fence range based on the radio waves, to prevent the pet from escaping out of the range. However, in practice, an owner of the pet needs an electric fence device to form a restricted range, and the pet is not allowed to enter the restricted range. In this way, the pet is prevented from destroying objects located in the restricted range. Therefore, applicability of the electric fence device in the art is limited.

SUMMARY OF THE DISCLOSURE

The present disclosure provides an electronic fence device including: a transmitter, arranged to preset a fence range or a restricted range; and at least one receiver, configured to be worn on a pet. The transmitter comprises a locating module; each of the at least one receiver comprises a tag module; the locating module and the tag module are configured to exchange measurement signals therebetween to monitor a location of the pet in real time. The transmitter is configured to compare the location of the pet with the fence range or the restricted range; in response to the pet being located out of the fence range or entering the restricted range, the transmitter is configured to provide a feedback to the receiver to give a warning to the pet.

The present disclosure further provides an electronic fence system, including: a transmitter, configured to preset a fence range or a restricted range; and at least one receiver, configured to be worn on the pet. The transmitter comprises a locating module, and each of the at least one receiver comprises a tag module; the locating module and the tag module are communicatively connected to each other via a first channel to exchange UWB signals to monitor a location of the pet in real time. The transmitter is configured to compare the location of the pet with the fence range or the restricted range; in response to the pet being located of the fence range or entering the restricted range, the transmitter is configured to feed the location back to the receiver through a second channel and to transmit a warning to the pet.

Figure 1:
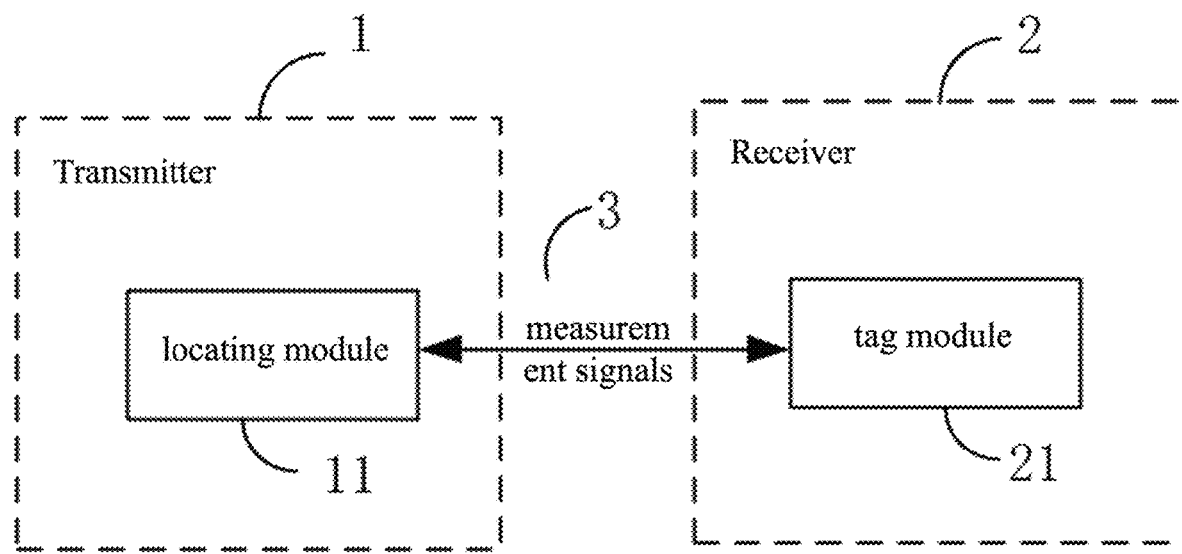
FIG. 1 is a first structural schematic diagram of a portion of functional modules of an electric fence device according to an embodiment of the present disclosure.

REFERENCE NUMERALS IN THE DRAWINGS 1-transmitter; 2-receiver; 3-measurement signal; 11-locating module; 21-tag module; 111-first transceiver unit; 112-first UWB antenna; 113-processor unit; 211-second transceiver unit; 212-second UWB antenna; 51-first UWB signal; 52-second UWB signal; 12-first control module; 13-first wireless communication module; 22-second wireless communication module; 23-second control module; 131-first communication antenna; 221-second communication antenna; 6-second channel; 122-determination unit; 121-collecting unit; 4-first channel; 24-battery; 25-warning module; 5-UWB signal; 7-control signal; 8-power level information; 9-user instruction; 10-terminal; 14-function operation module; 15-display module; 251-buzzer alarm module; 252-vibration module; 253-electric shock module; 26-warning instruction.

DETAILED DESCRIPTION

In order to make purposes, features and advantages of the present disclosure more obvious and understandable, embodiments of the present disclosure will be described in detail by referring to the accompanying drawings in the following.

To be noted that the terms "first", "second", and so on, in the specification, claims and the accompanying drawings of the present disclosure are used to distinguish objects and shall not be interpreted as describing a particular order or sequence. To be understood that data used in such a way may be interchangeable, such that the embodiments of the present disclosure described herein can be implemented in an order other than those illustrated or described herein.

In the description of the present disclosure, it is to be noted that the terms "arranged", "mounted", "connected", "coupled" shall be understood in a broad sense, unless otherwise expressly specified and qualified. For example, connection may be fixed connection, detachable connection, configured as a one-piece structure; or mechanical connection; or direct connection, indirect connection through an intermediate medium; or connection within two elements. Any ordinary skilled person in the art shall understand the specific meaning of the above terms in the context of the present disclosure case by case.

In the description of the present disclosure, "embodiment", "one embodiment", "an embodiment", and so on, means that specific features, structures, materials, or properties described in an embodiment or implementation are included in at least one embodiment or implementation of the present disclosure. In the present specification, schematic expressions of the above terms do not necessarily refer to a same embodiment or implementation. Moreover, the described specific features, structures, materials, or properties may be combined in any one or more of the embodiments or implementations in a suitable manner.

The present disclosure will be described in detail below by referring to the accompanying drawings.

To solve the above technical problems, as shown in FIG. 1, the present disclosure provides an electronic fence device including following components.

A transmitter 1 is arranged to preset a fence range or a restricted range.

At least one receiver 2 is configured to be worn on a pet.

The transmitter 1 includes a locating module 11. The receiver 2 includes a tag module 21. The locating module 11 and the tag module 21 exchange measurement signals 3 therebetween to monitor a location of the pet in real time.

The transmitter 1 compares the location of the pet with the fence range or the restricted range. When the pet is located out of the fence range or enters the restricted range, the transmitter 1 provides a feedback to the receiver 2 to give a warning to the pet.

To be noted that, when in use, the fence range or the restricted range is generated by taking the transmitter 1 as a center. The fence range is a range to prevent the pet from running out. The restricted range is a range to which the pet is not allowed to enter. A user may determine to set one or both of the fence range and the restricted range according to demands. For example, the pet owner takes a house as a center, setting an indoor area as the restricted range and setting an outdoor courtyard area as the fence range. The pet cannot leave the courtyard area and cannot enter the indoor area, such that indoor supplies cannot be damaged by the pet. Therefore, applicability of the electronic fence device is improved.

Figure 2:
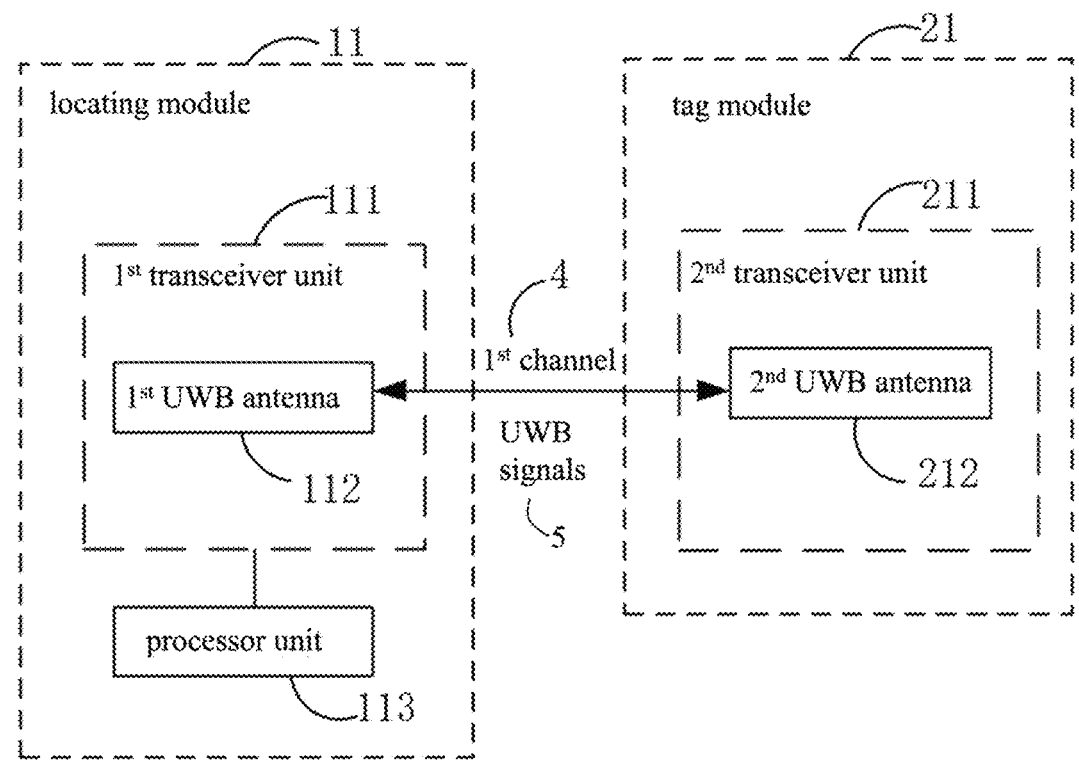
FIG. 2 is a structural schematic diagram of a locating module and a tag module according to an embodiment of the present disclosure.
Figure 3:
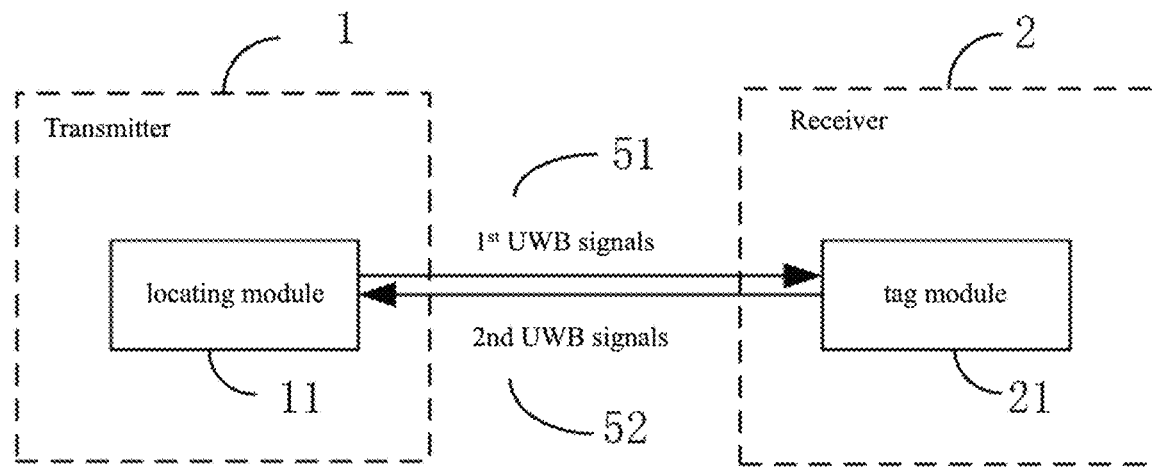
FIG. 3 is a second structural schematic diagram of the portion of functional modules of the electric fence device according to an embodiment of the present disclosure.

In an embodiment of the present disclosure, as shown in FIGS. 1, 2 and 3, the measurement signals 3 are UWB signals 5. The UWB signals 5 include at least a first UWB signal 51 and a second UWB signal 52.

The locating module 11 is configured to transmit the first UWB signal 51 to the tag module 21 and to receive the second UWB signal 52 transmitted from the tag module 21.

The tag module 21 is configured to receive the first UWB signal 51 and to transmit the second UWB signal 52.

The locating module 11 further includes a processor unit 113. The processor unit 113 is configured to collect and calculate a time of flight of the first UWB signal 51 and a time of flight of the second UWB signal 52 and an arrival phase difference, such that the location of the pet is obtained.

The electric fence device in the art may monitor the location of the pet in real time by wireless GPS, wireless RSSI, wireless magnetic fields, and so on. However, the above monitoring methods have respective drawbacks. In the method of monitoring the location of the pet by the wireless RSSI, an error in distance determination may be excessively large. In the method of monitoring the location of the pet by the wireless magnetic field, a boundary distance is limited, the error in distance determination may be excessively large, and a metal object may affect distance determination. In the method of monitoring the location of the pet by the wireless GPS, locating accuracy is poor, and the distance determination may be easily affected by signals. Therefore, for all of the above monitoring methods, the monitoring accuracy is poor. In the present disclosure, the measurement signals 3 are the UWB signals 5, and the UWB signal 5 has an extremely narrow time domain width, and locating based on the UWB signals have precision at a centimeter level. The UWB signal has a large bandwidth. A transmission power spectral density of the UWB signals is lower than that of noise. A probability of intercepting and interfering the UWB signals is significantly low. Therefore, the location of the pet can be accurately monitored, and a boundary of the fence range and a boundary of the restricted range may be defined accurately. A part of a reason of setting the restricted range is that the location of the pet can be accurately monitored. When locating the pet, the locating module 11 and the tag module 21 periodically exchange the UWB signals 5 to locate and monitor the pet. In one exchanging cycle, the UWB signals 5 include at least the first UWB signal 51 and the second UWB signal 52. The locating module 11 includes a first transceiver unit 111. The first transceiver unit 111 includes a UWB chip and a first UWB antenna 112, which will be described in the following. The UWB chip is integrated with an RF end, such that the UWB chip proactively generates the first UWB signal 51 and transmits UWB chip to the tag module 21 through the first UWB antenna 112. In addition, a timestamp of transmitting the first UWB signal 51 is recorded. The tagging module 21 includes a second transceiver unit 211. The second transceiver unit 211 is a UWB transceiver. The UWB transceiver includes a second UWB antenna 212, which will be described in the following. The second transceiver unit 211 passively receives the first UWB signal 51 and records a timestamp of the reception. After delaying for a certain time length, the second transceiver unit 211 transmits the second UWB signal 52 and records a timestamp of transmitting the second UWB signal 52. The transmitter 1 receives the second UWB signal 52 and records a timestamp of the reception. Based on the above four timestamps and the certain time length, the time of flight of the first UWB signal 51 and the time of flight of the second UWB signal 52 are obtained. Since the first UWB signal 51 and the second UWB signal 52 are propagating at the speed of light, a distance of flight, i.e., a distance between the transmitter 1 and the receiver 2, can be obtained. Furthermore, the location of the pet is determined based on the arrival phase difference between the first UWB signal 51 and the second UWB signal 52. The locating module 11 and the tag module 21 use periodic pulses to transmit the UWB signals 5. A pulse duration is very short, usually between 0.20 ns and 1.5 ns, and a duty cycle of the pulses is very low. Therefore, using the UWB signals 5 for locating reduces power consumption of the transmitter 1 and the receiver 2.

In an embodiment of the present disclosure, as shown in FIG. 2, the locating module 11 includes the first UWB antenna 112, the tag module 21 includes the second UWB antenna 212. The first UWB antenna 112 and the second UWB antenna 212 cooperatively form a first channel 4.

To be noted that, only the UWB signals 5 are transmitted through the first channel 4, and therefore, the UWB signals 5 may be independently processed. In this way, a response to the UWB signals 5 is fast, locating accuracy is improved, power consumption for UWB monitoring is reduced, and power supply performance of batteries 24 of the transmitter 1 and the receiver 2 is optimized.

Figure 4:
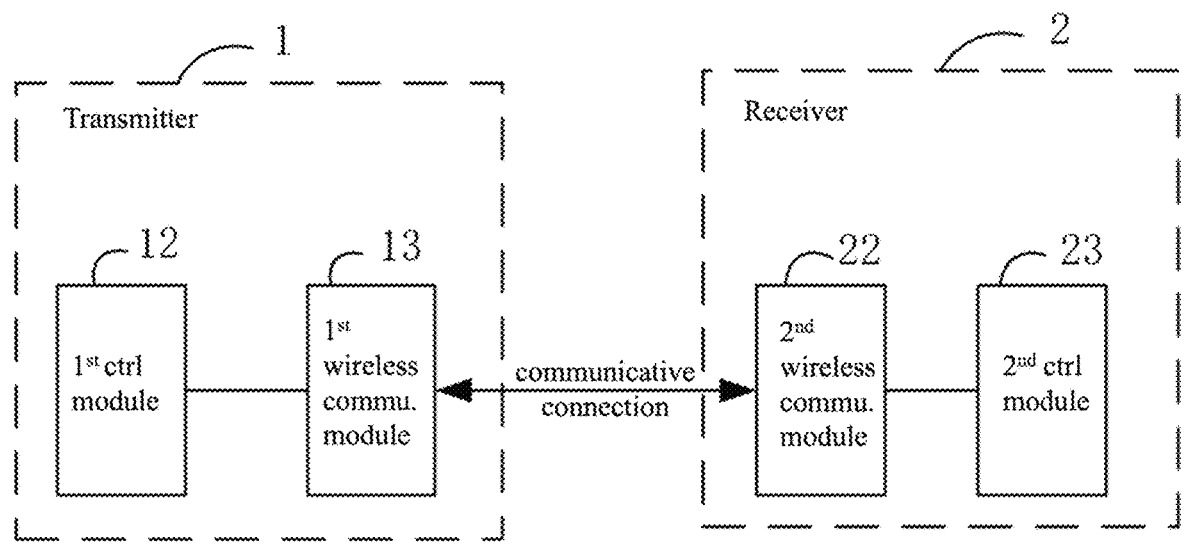
FIG. 4 is a third structural schematic diagram of the portion of functional modules of the electric fence device according to an embodiment of the present disclosure.

In an embodiment of the present disclosure, as shown in FIG. 4, the transmitter 1 further includes a first control module 12 and a first wireless communication module 13. The receiver 2 includes a second control module 23 and a second wireless communication module 22.

The first control module 12 and the second control module 23 are communicatively connected to each other via the first wireless communication module 13 and the second wireless communication module 22.

To be noted that the first control module 12 and the second control module 23 are core components for regulating operations of the transmitter 1 and the receiver 2. In addition to exchanging the UWB signals 5, inputting user instructions 9 in a subsequent process, a warning module 25 of the receiver 2, and operation states of the batteries 24 all require data transmission. The first wireless communication module 13 and the second wireless communication module 22 are independently configured to transmit and receive data, and multi-frequency domain signal processing may be achieved with the first channel 4. Adaptation between the first wireless communication module 13 and the second wireless communication module 22 may be achieved by WiFi modules, Bluetooth modules, 4G/5G modules and so on.

Figure 5:
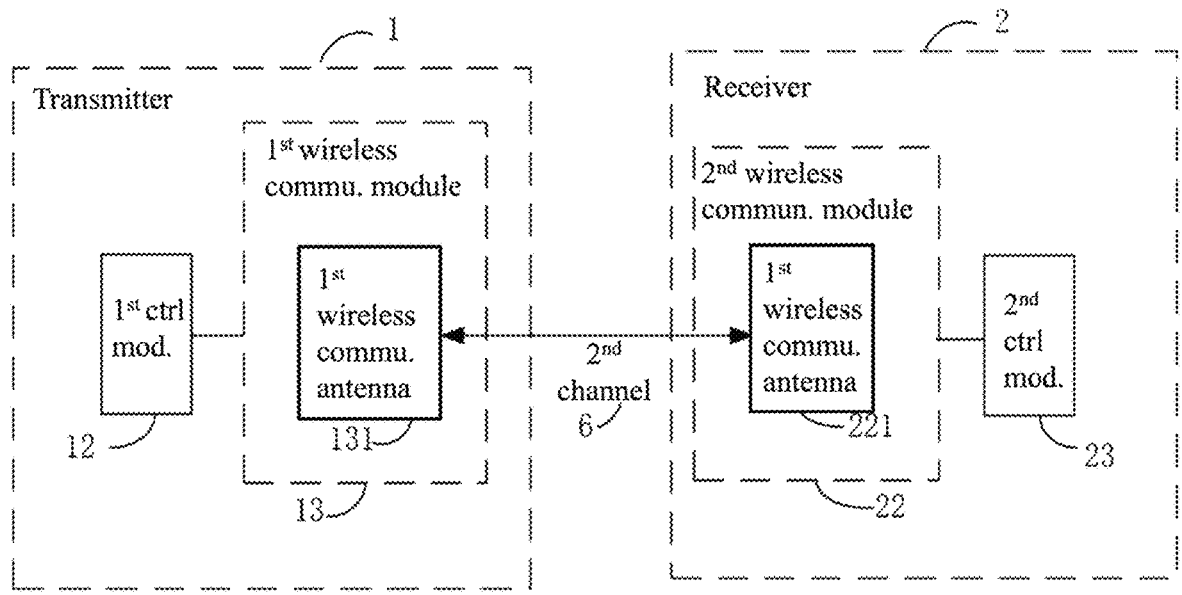
FIG. 5 is a fourth structural schematic diagram of the portion of functional modules of the electric fence device according to an embodiment of the present disclosure.

In an embodiment of the present disclosure, as shown in FIG. 5, the first wireless communication module 13 includes a first communication antenna 131, the second wireless communication module 22 includes a second communication antenna 221. The first communication antenna 131 and the second communication antenna 221 cooperatively form a second channel 6.

To be noted that, in some embodiments, each of the first wireless communication module 13 and the second wireless communication module 22 is a RF433 wireless module, such that each of the first communication antenna 131 and the second communication antenna 221 is a 433 antenna. By configuring the second channel 6 for transmitting and receiving data other than the UWB signals 5, multi-frequency domain signal processing is achieved, resistance against interference in a same frequency domain is improved effectively. Signals of the RF433 wireless module have a higher level of penetration. When a transmission power is large enough, long-distance transmission is achieved. In addition, in a normal operation mode, a wireless link is established only when data needs to be sent. Therefore, interference to other devices in a network is greatly reduced, and power consumption of the device itself is reduced. When a plurality of receivers 200 are arranged, the RF433 wireless module supports various wireless data communication methods, including point-to-point wireless data communication and one-to-multipoint wireless data communication. Therefore, transceiver integration, safety isolation, installation isolation, simple usage, a high quality-price, stability and reliability of the device can be achieved.

Figure 6:
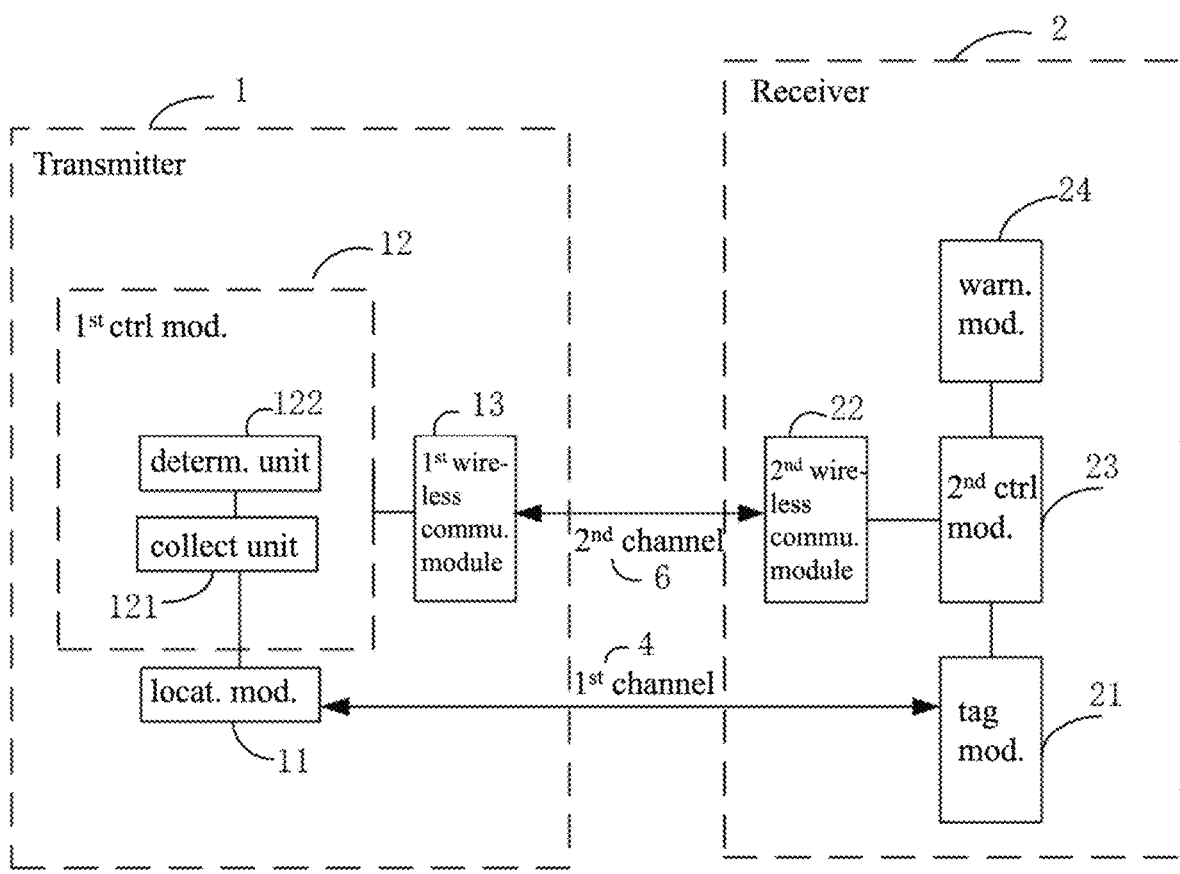
FIG. 6 is a fifth structural schematic diagram of the portion of functional modules of the electric fence device according to an embodiment of the present disclosure.
Figure 7:
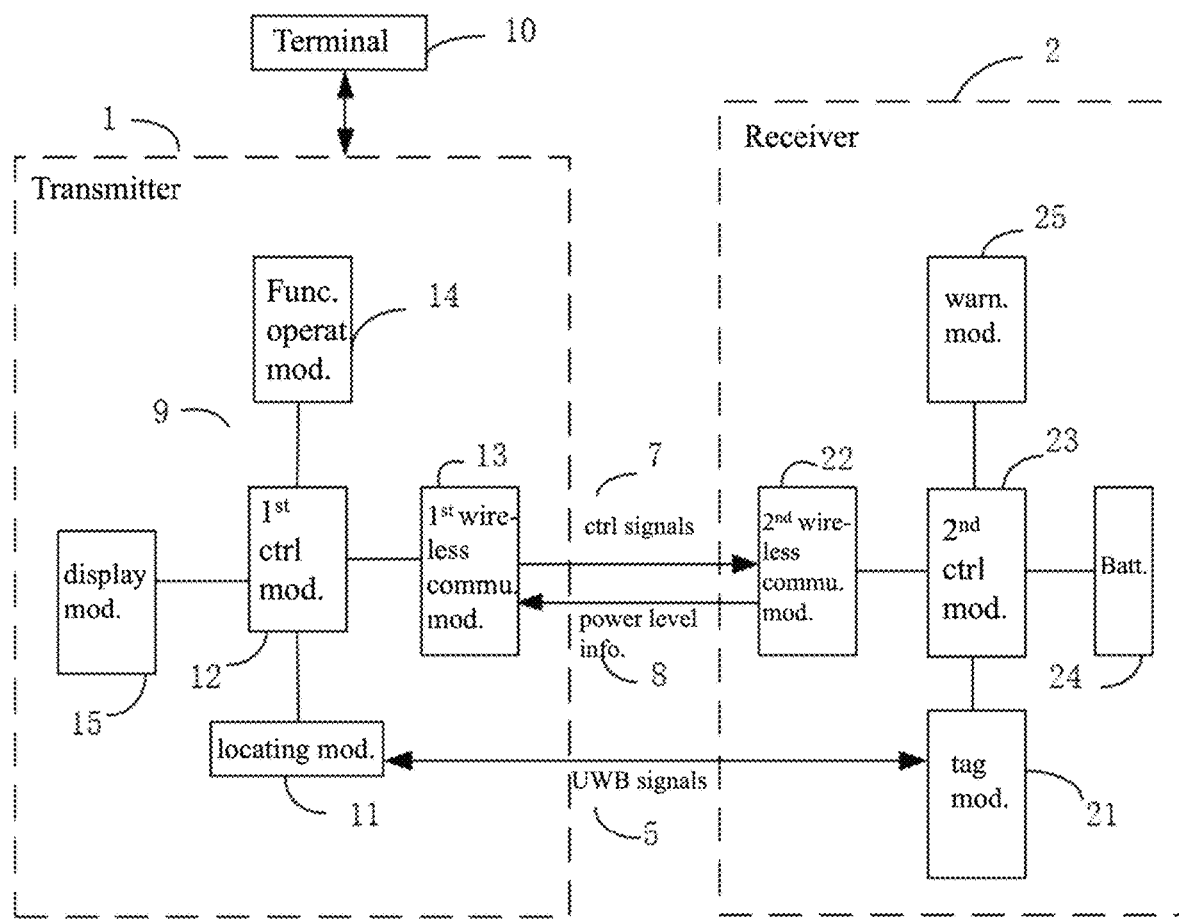
FIG. 7 is a structural schematic view of the functional modules of the electric fence device according to an embodiment of the present disclosure.

In an embodiment of the present disclosure, as shown in FIGS. 6 and 7, the first control module 12 is configured to generate a control signal 7 based on an input user instruction 9. The control signal 7 includes fence range setting, restricted range setting, setting a boundary of the fence range and a boundary of the restricted range, and setting of a warning method for the pet to be used by the receiver 2.

To be noted that the first control module 12 generates the control signal 7 based on the user instruction 9, i.e., including: setting the fence range or the restricted range. Since setting the fence range or the restricted range is setting a circular range having a certain radius and taking the transmitter 1 as a circle center, the user may regulate and set the boundaries of the fence range and the restricted range by setting a length of the radius. The receiver 2 has a plurality of warning methods. The user may use the transmitter 1 to select the warning method.

In an embodiment of the present disclosure, as shown in FIGS. 6 and 7, the first control module 12 and the second control module 23 transmit the control signal 7 via the second channel 6, enabling the receiver 2 to respond to the control signal 7.

To be noted that the first control module 12 transmits the control signal 7 to the second control module 23 via the RF433 wireless module. The second control module 23 controls the receiver 2 to respond to the control signal 7. It is understood that the first control module 12 and the second control module 23 are in bi-directional communication with each other. When the second control module 23 receives the control signal 7 transmitted from the first control module 12, the second control module 23 also feeds back the data of the receiver 2 to the first control module 12.

In an embodiment of the present disclosure, as shown in FIGS. 6 and 7, the first control module 12 includes a collecting unit 121, the collecting unit 121 is electrically connected to the locating module 11 to collect the location of the pet. The first control module 12 includes a determination unit 122. When the location of the pet is out of the fence range or is located in the restricted range, the first control module 12 provides a warning instruction 26 to the second control module 23 to give a warning to the pet.

To be noted that the first control module 12 is electrically connected to the locating module 11, such that the locating module 11 is controlled to monitor the location of the pet in response to the control signal 7. When the locating module 11 monitors and obtains the location of the pet, the first control module 12 collects and obtains the location of the pet. The first control module 12 further includes the determination unit 122, the collecting unit 121 is electrically connected to the determination unit 122 to transmit the collected location of the pet to the determination unit 122. Since a determination condition is preset in the determination unit 122, when the location of the pet is out of the fence range or is located in the restricted range, the determination unit 122 enables the first control module 12 to issue the warning instruction 26 to the second control module 23, and the second control module 23 controls the receiver 2 to give the warning to the pet.

Figure 8:
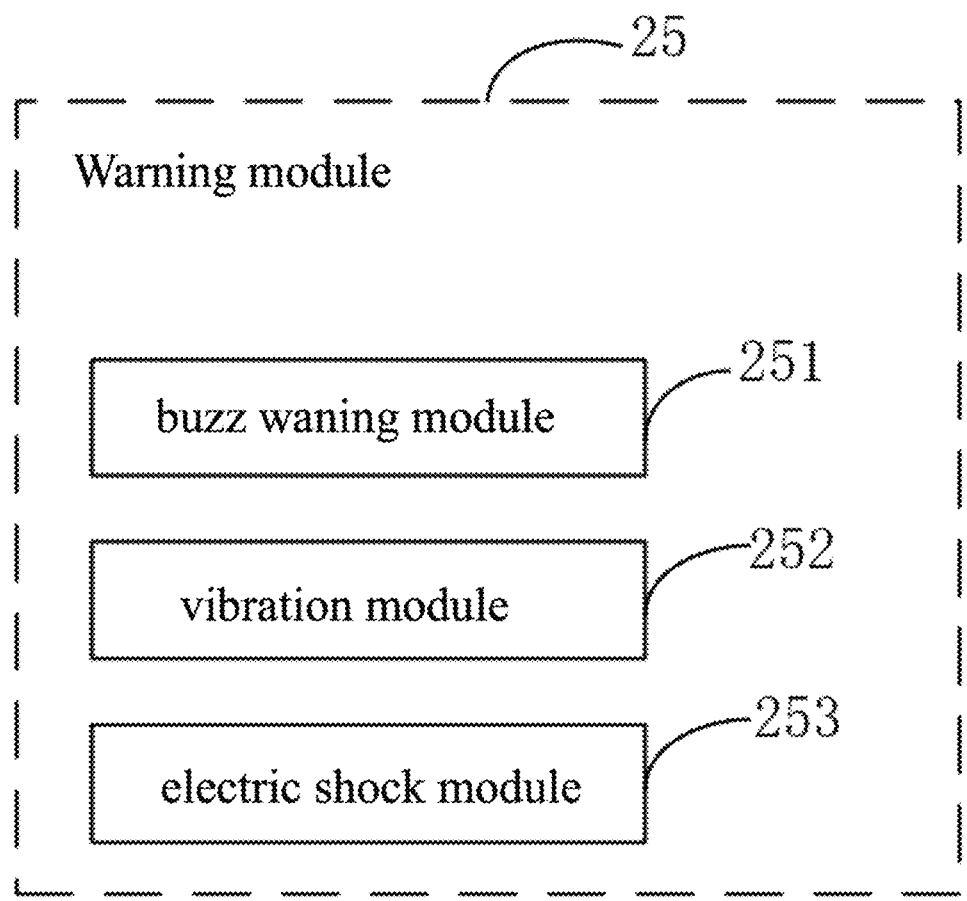
FIG. 8 is a structural schematic view of a warning module of the electric fence device according to an embodiment of the present disclosure.

In an embodiment of the present disclosure, as shown in FIGS. 7 and 8, the receiver 2 further includes a warning module 25, the warning module 25 is electrically connected to the second control module 23, the warning module 25 includes at least one of the following modules.

A buzzer alarm module 251 is electrically connected to the second control module 23 and is configured to operate under control of the second control module 23.

A vibration module 252 is electrically connected to the second control module 23 and is configured to operate under control of the second control module 23.

An electric shock module 253 is electrically connected to the second control module 23 and is configured to operate under control of the second control module 23.

To be noted that the second control module 23 receives the control signal 7 via the second wireless communication module 22. The control signal 7 includes setting of the warning method. Therefore, at least one of the buzzer alarm module 251, the vibration module 252 and the electric shock module 253 is controlled to operate according to the control signal 7. A piezoelectric buzzer or a magnetic buzzer may be configured as the buzzer alarm module 251. A rotor motor or a linear motor may be configured as the vibration module 252. The electric shock module 253 includes a transformer, and the second control module 23 is electrically connected to the transformer to drive the transformer to generate a high level, such that an electric shock, within a safe range, may be applied to the pet.

In an embodiment of the present disclosure, as shown in FIG. 7, the transmitter 1 further includes a function operation module 14, the function operation module 14 is electrically connected to the first control module 12, facilitating the user to input the user instruction 9.

To be noted that the function operation module 14 includes functional buttons, such as a fence mode button, a restricted range mode button, an adjustment button for setting the length of the radius, a selection button for selecting an application scenario, and so on. The functional buttons may be mechanical buttons or touch buttons. The user may input, through the functional buttons, the user instruction 9 based on his/her own demands, so as to generate the control signal 7. In this way, the user may use the device easily, and the usage experience is improved.

In an embodiment of the present disclosure, as shown in FIG. 7, the receiver 2 further includes a battery 24, the battery 24 is electrically connected to the second control module 23, the second control module 23 transmits power level information 8 of the battery 24 to the first control module 12 via the second channel 6.

To be noted that the receiver 2 is arranged with a battery 24. The power level information 8 of the battery 24 is transmitted to the first controller via the second control module 23 and is displayed on a display module 15. In this way, the user is facilitated to check a power level of the receiver 2, and the receiver 2 may be charged in time, preventing the receiver 2 from operating abnormally due to the power level of the receiver 2 being exhausted.

In an embodiment of the present disclosure, as shown in FIG. 7, the transmitter 1 further includes the display module 15, the display module 15 is electrically connected to the first control module 12 to display monitoring data of the transmitter 1 and the receiver 2. The monitoring data includes the location of the pet, whether the location is located out of the fence range or is located in the restricted range, and the power level information 8.

To be noted that most transmitters 1 in the art are not provided with the display module 15. The location of the pet is represented only by beeps having different pitches emitted by the receiver 2. Therefore, the user may not understand the beeps easily and may not deal with the warning in a timely manner. In the present disclosure, the display module 15 is arranged. The display module 15 includes a display screen. Therefore, the user may easily see the monitoring data of the transmitter 1 and the receiver 2 through the display screen. The monitoring data includes the location of the pet, whether the location is located out of the fence range or is located in the restricted range, and the power level information 8, such that the usage experience is improved.

In an embodiment of the present disclosure, the display module 15 includes a plurality of display regions. Each display region independently displays a respective one type of monitoring data.

To be noted that the display module 15 includes a plurality of display regions. That is, one display screen is arranged and is split to form the plurality of display regions. Each display region independently displays a respective one type of monitoring data. For example, when setting the fence range, one of the plurality of display regions displays the location of the pet and whether the location is located out of the fence range. When setting the restricted range, another one of the plurality of display regions displays the location of the pet and whether the location is located in of the restricted range. By splitting the display screen for displaying, the user is facilitated to view relevant information.

In an embodiment of the present disclosure, as shown in FIG. 7, the transmitter 1 is further configured to access a terminal 10, facilitating the user to enter the user instruction 9 on the terminal 10 and to view the monitoring data.

To be noted that the terminal 10 is arranged, the terminal 10 may be a communication device, such as a computer, a tablet, a mobile phone, and so on. The transmitter 1 is communicatively connected to the terminal 10 through the first wireless communication module 13. When the user cannot perform operations on the transmitter 1, the user may enter the user instruction 9 through the terminal 10. The terminal 10 also displays the monitoring data, facilitating the user to view the data from the terminal.

The present disclosure further provides an electric fence system, as shown in FIGS. 1, 2, 3, and 5, the electric fence system includes the following.

The transmitter 1 is configured to preset the fence range or the restricted range.

At least one receiver 2 is configured to be worn on the pet.

The transmitter 1 includes the locating module 11, and the receiver 2 includes the tag module 21. The locating module 11 and the tag module 21 are communicatively connected to each other via the first channel 4 to exchange the UWB signals 5 to monitor the location of the pet in real time.

The transmitter 1 compares the location of the pet with the fence range or the restricted range. When the pet is located of the fence range or enters the restricted range, the location is fed back to the receiver 2 through the second channel 6, and the warning is given to the pet.

The locating module 11 includes the first UWB antenna 112. The tag module 21 includes the second UWB antenna 212. The first UWB antenna 112 and the second UWB antenna 212 cooperatively form the first channel 4.

The transmitter 1 includes the first communication antenna 131; the receiver 2 includes the second communication antenna 221. The first communication antenna 131 and the second communication antenna 221 cooperatively form the second channel 6.

To be noted that the transmitter 1 and the receiver 2 are arranged with four antennas, i.e., the first UWB antenna 112, the second UWB antenna 212, the first communication antenna 131, and the second communication antenna 221. The first UWB antenna 112 and the second UWB antenna 212 cooperatively form the first channel 4 so as to exchange the UWB signals 5 between the locating module 11 and the tag module 21 to monitor the location of the pet. The first communication antenna 131 and the second communication antenna 221 cooperatively form the second channel 6 to enable the transmitter 1 to be communicatively connected to the receiver to transmit the control signal 7. By arranging the four antennas, multi-frequency domain signal processing is achieved, resistance against interference in the same frequency domain is effectively improved, each of different signals can be independently processed. Therefore, delay of the UWB signals 5 and the control signals 7 is in nanoseconds, all kinds of signals are responded fast, locating accuracy is improved, and the power consumption of the electric fence system is reduced dramatically.

To be noted that the above technical features can be further combined with each other to form various more embodiments which are not listed in the above, and the more embodiments are within the scope of the present disclosure. Furthermore, any ordinary skilled person in the art may perform improvement or transformation according to the above specification, and the improvement and the transformation shall fall within the scope of the claims of the present application.

What is claimed is:

1. An electronic fence device, comprising:
a transmitter, arranged to preset a fence range or a restricted range, wherein each of the fence range and the restricted range is set by taking the transmitter as a range center;
at least one receiver, configured to be worn on a pet;
wherein, the transmitter comprises a locating module; each of the at least one receiver comprises a tag module; the locating module and the tag module are configured to exchange measurement signals therebetween to monitor a location of the pet in real time;
the transmitter is configured to compare the location of the pet with the fence range or the restricted range; in response to the pet being located out of the fence range or entering the restricted range, the transmitter is configured to provide a feedback to the receiver to give a warning to the pet;
wherein, the measurement signals are UWB signals; the UWB signals comprise at least a first UWB signal and a second UWB signal;
the locating module is configured to transmit the first UWB signal to the tag module and to receive the second UWB signal transmitted from the tag module;
the tag module is configured to receive the first UWB signal and to transmit the second UWB signal;
the locating module comprises a processor unit, the processor unit is configured to collect and calculate a time of flight of the first UWB signal, a time of flight of the second UWB signal, and an arrival phase difference, so as to determine the location of the pet.

2. The electronic fence device according to claim 1, wherein, the locating module comprises a first UWB antenna, the tag module comprises a second UWB antenna; the first UWB antenna and the second UWB antenna cooperatively form a first channel.

3. The electronic fence device according to claim 2, wherein, the first channel is configured to transmit the UWB signals between the locating module and the tag module to determine the location of the pet in real time.

4. The electronic fence device according to claim 3, wherein, the first channel is configured transmit only the UWB signals.

5. The electronic fence device according to claim 1, wherein, the transmitter further comprises a first control module and a first wireless communication module, the receiver comprises a second control module and a second wireless communication module;
the first control module and the second control module are communicatively connected to each other via the first wireless communication module and the second wireless communication module.

6. The electronic fence device according to claim 5, wherein, the first wireless communication module comprises a first communication antenna, the second wireless communication module comprises a second communication antenna; the first communication antenna and the second communication antenna cooperatively form a second channel.

7. The electronic fence device according to claim 5, wherein, the first control module is configured to generate a control signal based on an input user instruction; the control signal comprises: fence range setting, restricted range setting, setting a boundary of the fence range and a boundary of the restricted range, and setting of a warning method for the pet to be used by the receiver.

8. The electronic fence device according to claim 5, wherein, the first control module and the second control module are configured to transmit the control signal via the second channel, enabling the receiver to respond to the control signal.

9. The electronic fence device according to claim 6, wherein, the first control module comprises a collecting unit, the collecting unit is electrically connected to the locating module to collect the location of the pet; the first control module further comprises a determination unit;
in response to the location of the pet being out of the fence range or being located in the restricted range, the first control module transmits a warning instruction to the second control module to give a warning to the pet.

10. The electronic fence device according to claim 7, wherein, the receiver further comprises a warning module, the warning module is electrically connected to the second control module, the warning module comprises at least one of the following modules:
a buzzer alarm module, electrically connected to the second control module and configured to operate under control of the second control module;
a vibration module, electrically connected to the second control module and configured to operate under control of the second control module; and
an electric shock module, electrically connected to the second control module and configured to operate under control of the second control module.

11. The electronic fence device according to claim 7, wherein, the transmitter further comprises a function operation module, the function operation module is electrically connected to the first control module to enable the user to input the user instruction.

12. The electronic fence device according to claim 7, wherein, the receiver further comprises a battery, the battery is electrically connected to the second control module, the second control module is configured to transmit power level information of the battery to the first control module via the second channel.

13. The electronic fence device according to claim 12, wherein, the transmitter further comprises a display module, the display module is electrically connected to the first control module to display monitoring data of the transmitter and the receiver; the monitoring data comprises the location of the pet, whether the location is located out of the fence range or is located in the restricted range, and the power level information.

14. The electronic fence device according to claim 13, wherein, the display module comprises a plurality of display regions, and each of the plurality of display regions is configured to independently display a respective one type of monitoring data; or the transmitter is configured to access a terminal, the terminal is configured to enable the user to enter the user instruction and to display the monitoring data to the user.

15. The electronic fence device according to claim 1, wherein, the locating module of the transmitter and the tag module of the at least one receiver are communicatively connected to each other via a first channel, the first channel is dedicated for transmitting UWB signals to monitor a location of the pet in real time;

the transmitter further comprises a first communication module, the at least one receiver further comprises a second communication module; the first communication module and the second communication module are communicatively connected to each other via a second channel, the second channel is configured to transmit data other than the UWB signals.

16. The electronic fence device according to claim 1, wherein, the location of the pet is determined based on the arrival phase difference and a distance between the receiver and the transmitter, and the distance between the receiver and the transmitter is determined based on the time of flight of the first UWB signal and the time of flight of the second UWB signal.

17. An electronic fence system, comprising:

a transmitter, configured to preset a fence range or a restricted range;

at least one receiver, configured to be worn on the pet;

wherein, the transmitter comprises a locating module, and each of the at least one receiver comprises a tag module; the locating module and the tag module are communicatively connected to each other via a first channel, wherein the first channel is dedicated for exchanging only UWB signals to monitor a location of the pet in real time;

the transmitter is configured to compare the location of the pet with the fence range or the restricted range; in response to the pet being located of the fence range or entering the restricted range, the transmitter is configured to feed the location back to the receiver through a second channel and to transmit a warning to the pet; wherein the second channel is configured to transmit data other than the UWB signals.

18. The electronic fence system according to claim 17, wherein, the locating module comprises a first UWB antenna, the tag module comprises a second UWB antenna, the first UWB antenna and the second UWB antenna cooperatively form a first channel.

19. The electronic fence system according to claim 18, wherein, the transmitter comprises a first communication antenna; the receiver comprises a second communication antenna; the first communication antenna and the second communication antenna cooperatively form the second channel.

* * * * *